(12) United States Patent
Gantt et al.

(10) Patent No.: US 7,047,870 B2
(45) Date of Patent: May 23, 2006

(54) APPARATUS AND METHOD FOR BREWING A BEVERAGE WITH A DESIRED STRENGTH

(75) Inventors: Timothy D. Gantt, Goshen, KY (US); Thomas J. Pfeifer, Louisville, KY (US); William A. Dahmen, Goshen, KY (US); Tharon Hall, Fredericksburg, IN (US)

(73) Assignee: Grindmaster Corporation, Louisville, KY (US)

( * ) Notice: Subject to any disclaimer, the term of this patent is extended or adjusted under 35 U.S.C. 154(b) by 115 days.

(21) Appl. No.: 10/894,783

(22) Filed: Jul. 20, 2004

(65) Prior Publication Data

US 2005/0160917 A1 Jul. 28, 2005

Related U.S. Application Data

(60) Provisional application No. 60/540,241, filed on Jan. 28, 2004.

(51) Int. Cl.
*A47J 31/00* (2006.01)

(52) U.S. Cl. .............................. 99/305; 99/299; 99/283

(58) Field of Classification Search ................. 99/305, 99/283, 282, 299
See application file for complete search history.

(56) References Cited

U.S. PATENT DOCUMENTS

| 3,068,777 | A | 11/1962 | Pedalino |
| 4,056,050 | A | 11/1977 | Brown |
| 4,108,053 | A | 8/1978 | Vink |
| 4,328,740 | A | 5/1982 | McDonough et al. |
| 4,361,750 | A | 11/1982 | Miklas |
| 4,644,855 | A | 2/1987 | Woolman et al. |
| 4,744,291 | A | 5/1988 | Wallin |
| 5,111,740 | A | 5/1992 | Klein |
| 5,195,422 | A * | 3/1993 | Newnan ................ 99/283 |
| 5,637,335 | A | 6/1997 | Fond et al. |
| 5,638,741 | A | 6/1997 | Cisaria |
| 5,895,672 | A | 4/1999 | Cooper |
| 6,763,759 | B1 * | 7/2004 | Denisart ............. 99/302 P |
| 6,772,676 | B1 * | 8/2004 | Lassota ................ 99/283 |
| 6,829,981 | B1 * | 12/2004 | Lassota ................ 99/299 |
| 6,857,352 | B1 * | 2/2005 | Fischer ................ 99/280 |

FOREIGN PATENT DOCUMENTS

| CA | 2 341 071 | 9/2002 |
| EP | 0 041 657 A1 | 12/1981 |
| EP | 0 616 785 A1 | 9/1994 |
| GB | 2 329 825 A | 4/1999 |
| JP | 5-111436 | 5/1993 |
| JP | 2000-60735 A2 | 2/2000 |
| WO | WO 00/42891 A1 | 7/2000 |
| WO | WO 01/11983 A1 | 2/2001 |

* cited by examiner

*Primary Examiner*—Reginald L. Alexander
(74) *Attorney, Agent, or Firm*—Stites & Harbison, PLLC; David W. Nagle, Jr.

(57) ABSTRACT

An apparatus and method for brewing coffee or a similar brewed beverage allows a consumer to select a desired strength, and then, a serving of the brewed beverage is promptly brewed and dispensed in response to that selection. Regardless of the selected strength, a constant volume of beverage results; in other words, the strength of the brewed beverage is not altered by merely adding or subtracting water.

25 Claims, 7 Drawing Sheets

APPARATUS AND METHOD FOR BREWING A BEVERAGE WITH A DESIRED STRENGTH

CROSS-REFERENCE TO RELATED APPLICATIONS

The present application claims priority to U.S. Provisional Application Ser. No. 60/540,241 filed Jan. 28, 2004, the entire disclosure of which is incorporated herein by reference.

BACKGROUND OF THE INVENTION

The present invention relates to an apparatus and method for brewing a beverage, such as coffee, and, more particularly, to an apparatus and method that allows a consumer to select a desired strength of the beverage, and then brews and dispenses the beverage in response to that selection.

In brewing coffee or similar beverages, each consumer has their own taste preferences. In response, as an alternative to traditional multi-cup brewers, there have been efforts to develop brewers that use a single-serve pod. Thus, an individual consumer can brew a single serving of coffee or another beverage, and furthermore, has some flexibility in determining the relative strength of the brewed beverage. In many cases, however, to produce a lighter beverage, additional water is mixed into the brewed beverage to dilute it and lessen its strength. On the other hand, when a stronger beverage is desired, the water content is lessened. However, such a solution does not result in high-quality product and also may present challenges with respect to consumer perception. For example, a consumer who orders an eight-ounce cup of coffee does not want seven ounces of strong coffee in an eight-ounce cup, nor do they want a diluted, lighter coffee that is overflowing from the cup.

It is would therefore be desirable to provide an apparatus and method for brewing coffee or a similar beverage that allows a consumer to select a desired strength, and then brews and dispenses a high-quality beverage in response to that selection, but not by merely adding or subtracting water.

SUMMARY OF THE INVENTION

The present invention is an apparatus and method for brewing coffee or a similar brewed beverage with a desired strength. Specifically, a consumer can select a desired strength, and then, a serving of the brewed beverage is promptly brewed and dispensed in response to that selection. Furthermore, regardless of the selected strength, a constant volume of beverage results; in other words, the strength of the brewed beverage is not altered by merely adding or subtracting water.

An exemplary brewer apparatus made in accordance with the present invention includes a housing that houses the internal plumbing and control components of the apparatus. Furthermore, the exemplary brewer apparatus is designed to use a pod in the brewing process, which is generally manufactured from two substantially circular sections of filtering paper joined along their respective circumferential edges and enclosing a quantity of ground coffee, tea, or other beverage component. This pod is received and held in a tray or similar receptacle and positioned below the brew head of the apparatus, such that hot water is directed from the brew head over and through the pod and enclosed beverage component, with the brewed beverage then being dispensed into a cup or similar container. In accordance with the teachings of the present invention, the brewer apparatus allows a consumer to select a desired strength of the brewed beverage. This selection by the consumer is preferably accomplished by a selector switch on the front surface of the housing. One exemplary selector switch has three strength settings for a coffee beverage: (1) a light setting; (2) a regular setting; and (3) a strong setting, and further includes a fourth setting for tea. A consumer selects the appropriate setting by rotating the selector switch to the desired position, and then presses a "brew" button to initiate the brewing process.

If the selector switch is rotated to indicate that a light coffee is desired, upon pressing the "brew" button, a precise, predetermined volume of water is delivered to the hot water tank of the brewer (as measured by a flow meter), which, in turn, causes a precise, predetermined volume of hot water to be delivered to the brew head. This predetermined volume of hot water is distributed to and passes over and through the coffee pod, and the brewed coffee is dispensed through an outlet and into a cup or similar container.

If the selector switch is rotated to indicate that a regular coffee is desired, upon pressing the "brew" button, a second predetermined volume of hot water is delivered to moisten the coffee pod. Pumping then ceases for a predetermined time period to allow for pre-infusion of the coffee grounds to improve extraction and make a stronger brewed coffee. Pumping then resumes until the precise, predetermined volume of water has been delivered to the hot water tank (as measured by the flow meter), which, in turn, causes a precise, predetermined volume of hot water to be delivered to the brew head. Again, this predetermined volume of hot water is distributed to and passes over and through the coffee pod, and the brewed coffee is dispensed through an outlet and into the cup or similar container.

If the selector switch is rotated to indicate that a strong coffee is desired, upon pressing the "brew" button, a third predetermined volume of hot water is delivered to the coffee pod, and then pumping ceases for a predetermined time period, with an on-off or "pulsing" cycle continuing until the precise, predetermined volume of water has been delivered to the hot water tank (as measured by the flow meter), which, in turn, causes a precise, predetermined volume of hot water to be delivered to the brew head. By providing the periodic "off periods," a stronger brewed coffee results.

Finally, if the selector switch is provided with an option to brew tea and is rotated to this option, similar to the strong coffee option, a pulsing cycle is used to pump water until the precise, predetermined volume of water has been delivered to the hot water tank, and thus, the brew head.

In any event, regardless of which option is chosen, a constant predetermined volume of brewed beverage is dispensed. In other words, the strength of the brewed beverage is not altered by merely adding or subtracting water, but rather by increasing or decreasing the total dissolved solids in the brewed beverage.

DETAILED DESCRIPTION OF THE INVENTION

The present invention is an apparatus and method for brewing coffee or a similar brewed beverage with a desired strength. Specifically, a consumer can select a desired strength, and then, a serving of the brewed beverage is promptly brewed and dispensed in response to that selection. Furthermore, regardless of the selected strength, a constant volume of beverage results; in other words, the strength of the brewed beverage is not altered by merely adding or subtracting water.

Figure 1:
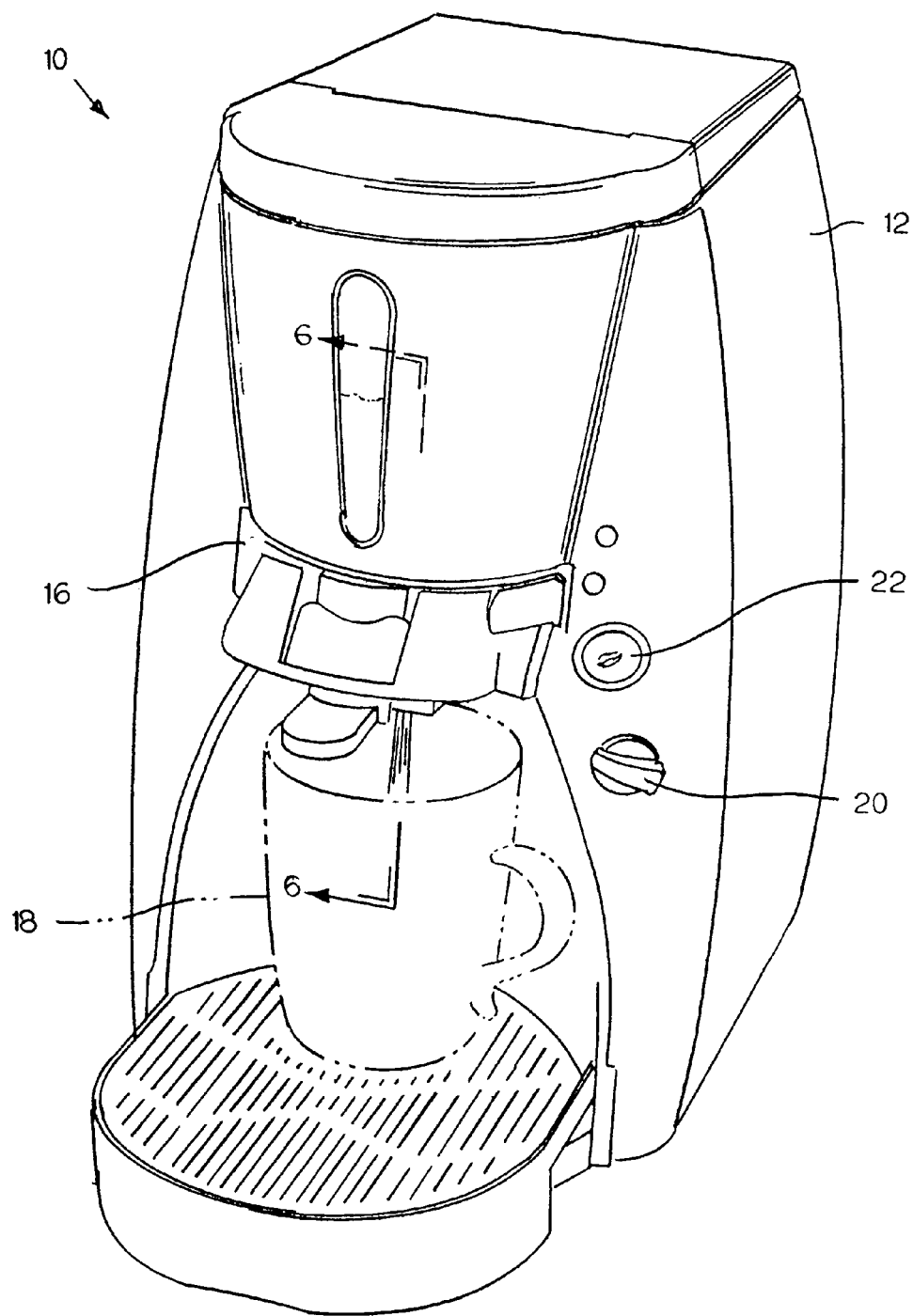
FIG. 1 is a perspective view of an exemplary brewer apparatus made in accordance with the present invention.

FIG. 1 is a perspective view of an exemplary brewer apparatus 10 made in accordance with the present invention. The brewer apparatus 10 includes a housing 12 that houses the internal plumbing and control components of the apparatus 10. Furthermore, the brewer apparatus 10 is designed to use a pod in the brewing process. Such a pod is generally manufactured from two substantially circular sections of filtering paper joined along their respective circumferential edges and enclosing a quantity of ground coffee, tea, or other beverage component. This pod is received and held in a tray or similar receptacle 16 and positioned below the brew head of the apparatus 10, such that hot water is directed from the brew head over and through the pod and enclosed beverage component, with the brewed beverage then being dispensed into a cup or similar container 18, as illustrated in FIG. 1. In this regard, the specific construction of the tray or similar receptacle 16 is not important to the present invention so long as the beverage component is properly positioned so that the water is directed over and through it. Furthermore, although a pod is one preferred means by which to enclose a beverage component, so long as the beverage component is properly positioned, whether or not the beverage component is enclosed in a pod is immaterial to the apparatus and method of the present invention.

Figure 2:
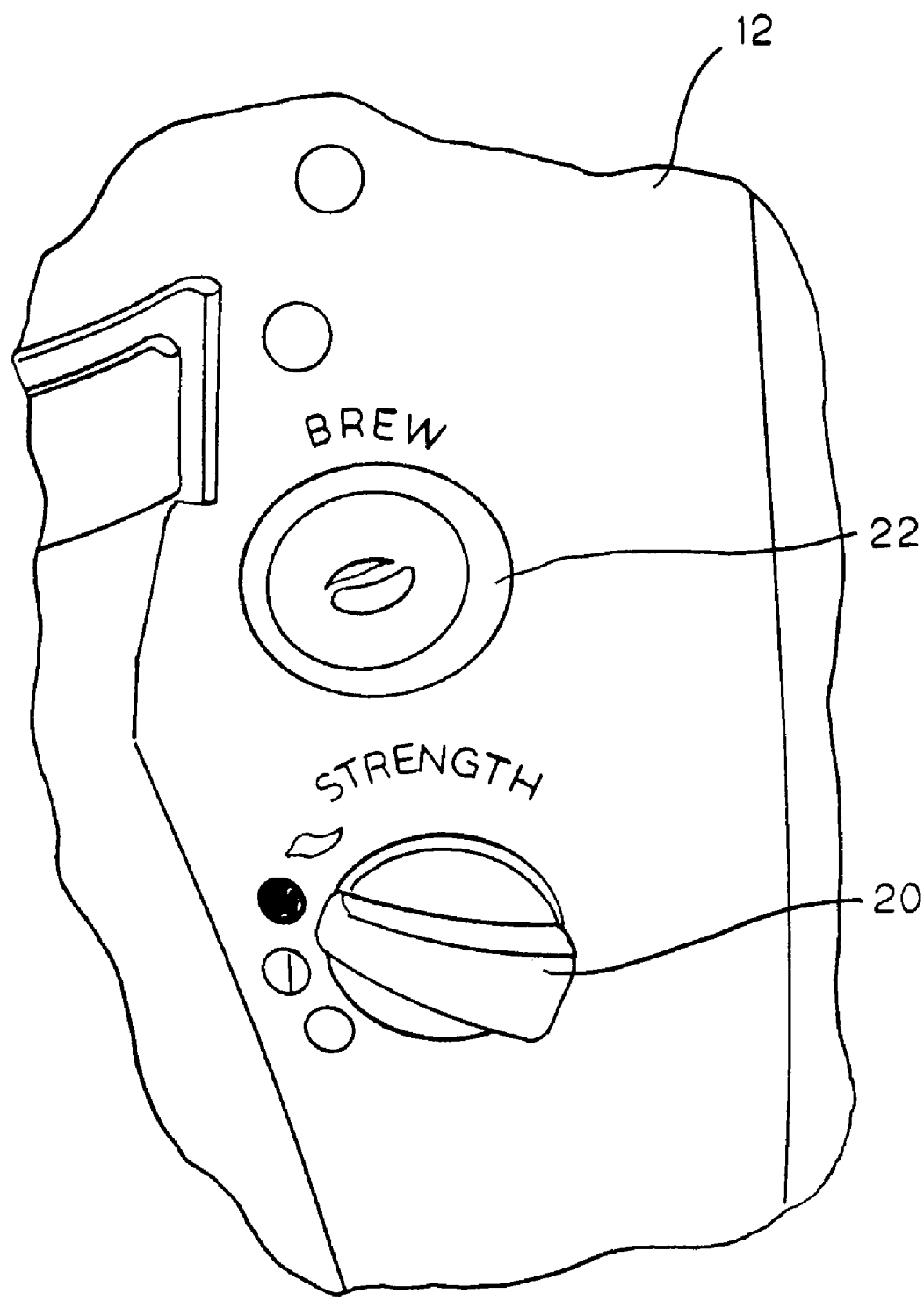
FIG. 2 is an enlarged view of the front surface of the exemplary brewer apparatus of FIG. 1, better illustrating the selection switch and "brew" button.

Referring still to FIG. 1, the apparatus and method of the present invention allows a consumer to select a desired strength of the brewed beverage. This selection by the consumer is preferably accomplished using a selector switch 20 on the front surface of the housing 12. Referring now to the enlarged view of FIG. 2, this particular selector switch 20 has three strength settings for a coffee beverage: (1) a light setting; (2) a regular setting; and (3) a strong setting, and further includes a fourth setting for tea. A consumer selects the appropriate setting by rotating the selector switch 20 to the desired position, and then presses the "brew" button 22 to initiate the brewing process, as is further described below. Of course, although the selector switch 20 in this exemplary embodiment is a rotary switch, a wide variety of switches or other input devices could be incorporated into the apparatus to allow for selection of the desired setting without departing from the spirit and scope of the present invention.

Figure 3:
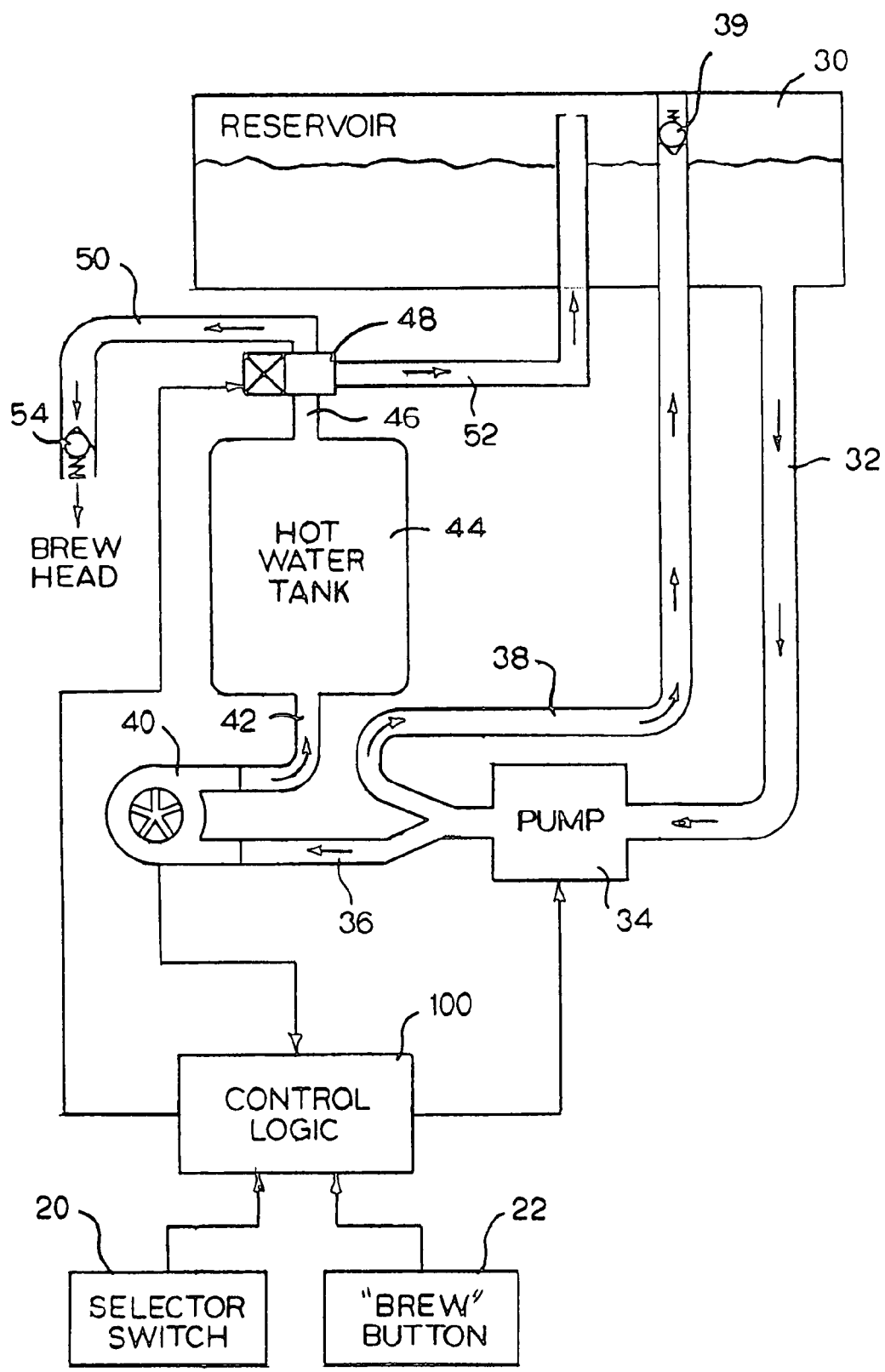
FIG. 3 is a schematic view of the plumbing system of the exemplary brewer apparatus of FIG. 1.
Figure 4:
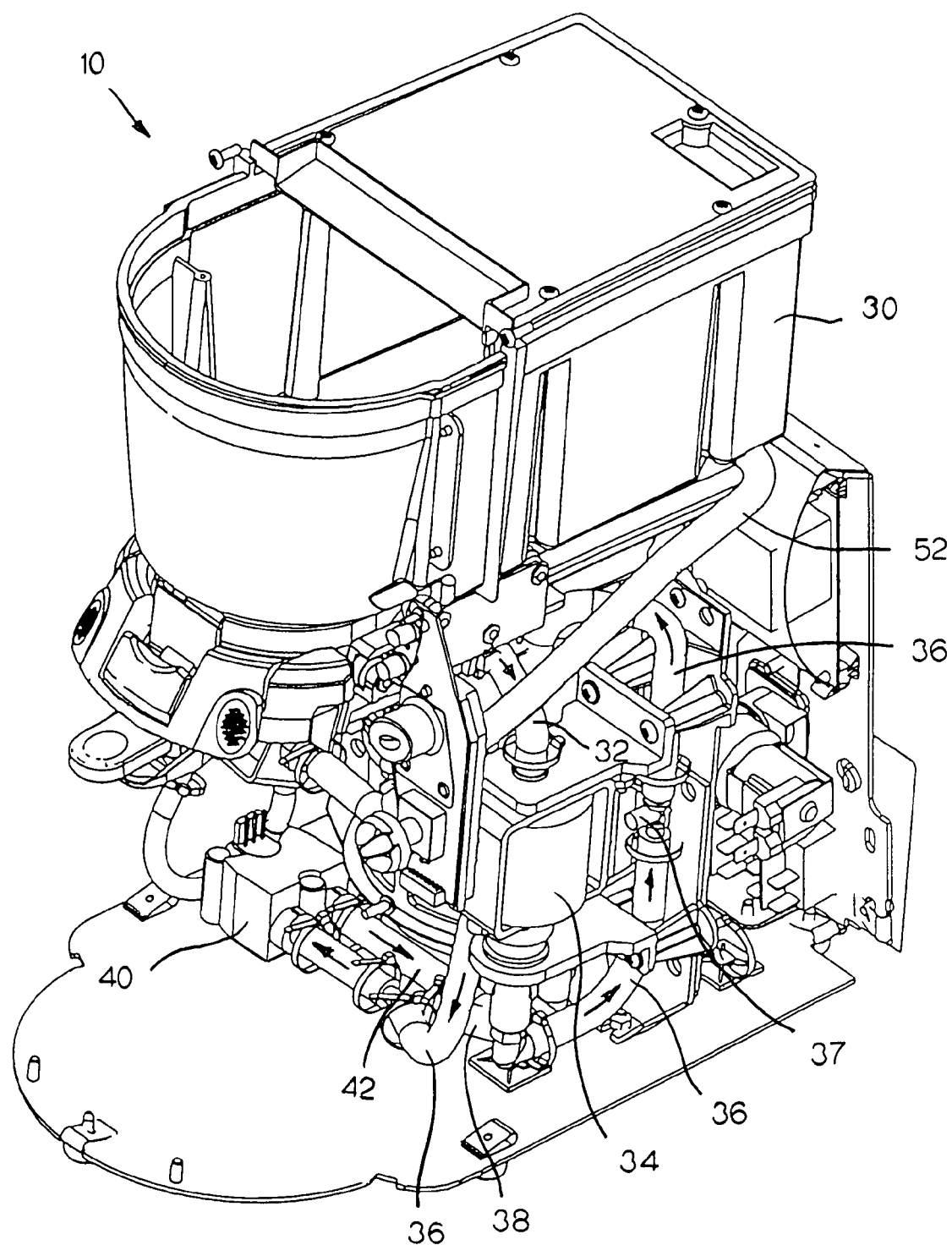
FIG. 4 is a perspective view of the exemplary brewer apparatus of FIG. 1, with the housing removed to show the internal plumbing and control components of the brewer apparatus.
Figure 5:
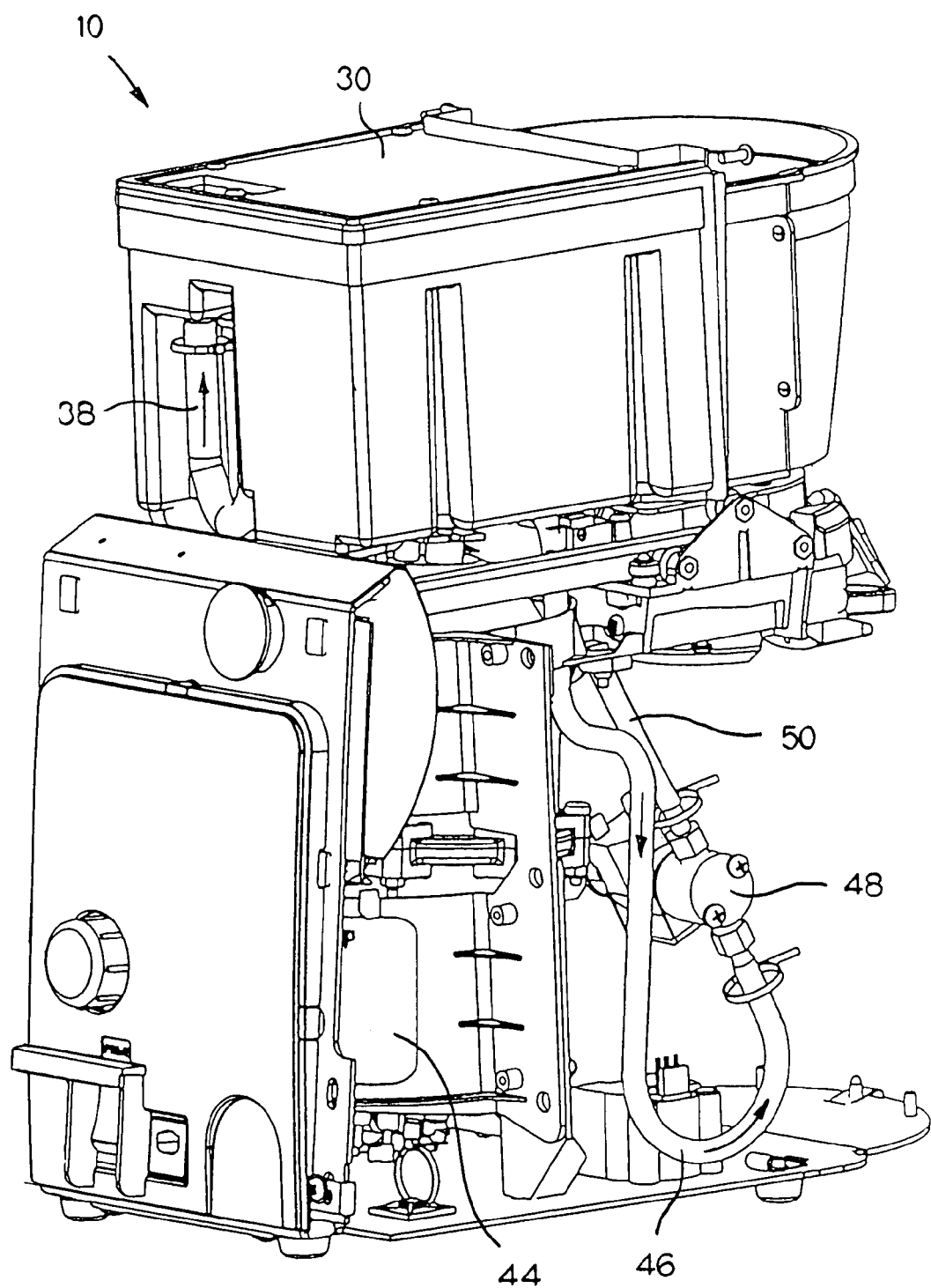
FIG. 5 is another perspective view of the exemplary brewer apparatus of FIG. 1, with the housing removed to show the internal plumbing and control components of the brewer apparatus.

FIG. 3 is a schematic view of the plumbing system for the exemplary brewer apparatus 10 described above with reference to FIGS. 1 and 2, while FIGS. 4 and 5 are perspective views of the exemplary brewer apparatus 10 with the housing 12 removed. Collectively, these Figures allow for a complete understanding of the flow of water through the brewer apparatus 10. As illustrated in these Figures, potable water is stored in and drawn from a water reservoir 30 through a length of tubing 32 via a pump 34. In this regard, although a pump is a preferred means by which to move water through the brewer apparatus 10, it is contemplated that water flow could be induced through gravity or other techniques without departing from the spirit and scope of the present invention. Furthermore, as with all tubing described in the present application, the length of tubing 32 is preferably made of a silicone or similar flexible, food-grade material.

In any event, the pump 34 is activated in response to an action of the consumer, specifically the selection of a beverage strength using the selector switch 20 and depression of the "brew" button 22 on the front surface of the housing 12 of the brewer apparatus 10, as described above with reference to FIG. 2. Furthermore, with respect to the control of the pump 34, as illustrated in the schematic view of FIG. 3, the brewer apparatus 10 includes a control logic 100 that receives signals from the selector switch 20 and the "brew" button 22. Based on these signals and other inputs, the control logic 100 operates the pump 34 and other components of the brewer apparatus 10, as is further described below. Also, it should be recognized and understood that the control logic 100 in this exemplary embodiment is a software code that is resident on a circuit board within the housing 12 of the brewer apparatus 10. Such software coding is readily accomplished by one of ordinary skill in the art.

As the water passes through the pump 34, it is directed to a hot water tank 44, which heats the water to a desired temperature. Specifically, the water exiting the pump 34 is directed through a length of tubing 36 to a flow meter 40. In this exemplary embodiment, the flow meter is a Model FLHC 20 flow meter manufactured and distributed by Digmesa AG of Ipsach, Switzerland. By using a flow meter 40 to measure volumetric flow, a precise, predetermined volume of water can be measured and delivered to the hot water tank 44, which, in turn, causes a precise, predetermined volume of hot water to be forced from the hot water tank 44 and delivered to the brew head, the importance of which is described in further detail below. Also, with respect to the flow meter 40, the measurement data is also communicated to the control logic 100 so that the pump 34 can be de-activated to terminate the water flow through the brewer apparatus 10 at the appropriate time.

With respect to the flow of water from the pump 34 to the flow meter 40, it should also be noted that, in this exemplary embodiment, there is a flow-restricting orifice 37 in the length of tubing 36, as illustrated in FIG. 4, that serves to reduce turbulence and ensure accurate measurement of volumetric flow by the flow meter 40. Furthermore, there is an additional length of tubing 38 which branches off from the length of tubing 36 before the water enters the flow meter 40. This additional length of tubing 38 extends into the water reservoir 30, as illustrated in FIGS. 3 and 5, where it terminates in a check valve 39. This allows for a pressure release should the pressure between the pump 34 and flow meter 40 exceed a predetermined level.

After the water exits the flow meter 40, it passes through another length of tubing 42 into the bottom of the hot water tank 44. As the substantially room-temperature, potable water is introduced into the lower portion of the tank 44, hot water is forced from the upper portion of the tank 44 through yet another length of tubing 46 to a three-way solenoid valve 48 that controls flow to the brew head. In this exemplary embodiment, the three-way solenoid valve is a Model NU243066-1353 valve manufactured and distributed by KIP Inc. of Farmington, Conn.

Assuming the solenoid valve 48 is open, water passes through the solenoid valve 48 into a another length of tubing 50, which delivers the hot water to the brew head. Specifically, as illustrated in the sectional view of FIG. 6, the hot water enters the brew head 60 from the length of tubing 50, and the hot water is then distributed over the pod 62 and enclosed beverage component, with the resultant brewed beverage then being dispensed into a cup or similar container 18 (as illustrated in FIGS. 1 and 6).

Furthermore, in this exemplary embodiment and as illustrated in FIG. 3, a check valve 54 may be provided near the inlet to the brew head to create a slight back-pressure that minimizes dripping from the tube 50 from the solenoid valve 48 to the brew head 60.

Finally, in this exemplary embodiment, there is another length of tubing 52 extending from the solenoid valve 48 and into the water reservoir 30, such that excess pressure caused by the heating of the water in the tank 44 can be vented to the reservoir 30.

Figure 6:
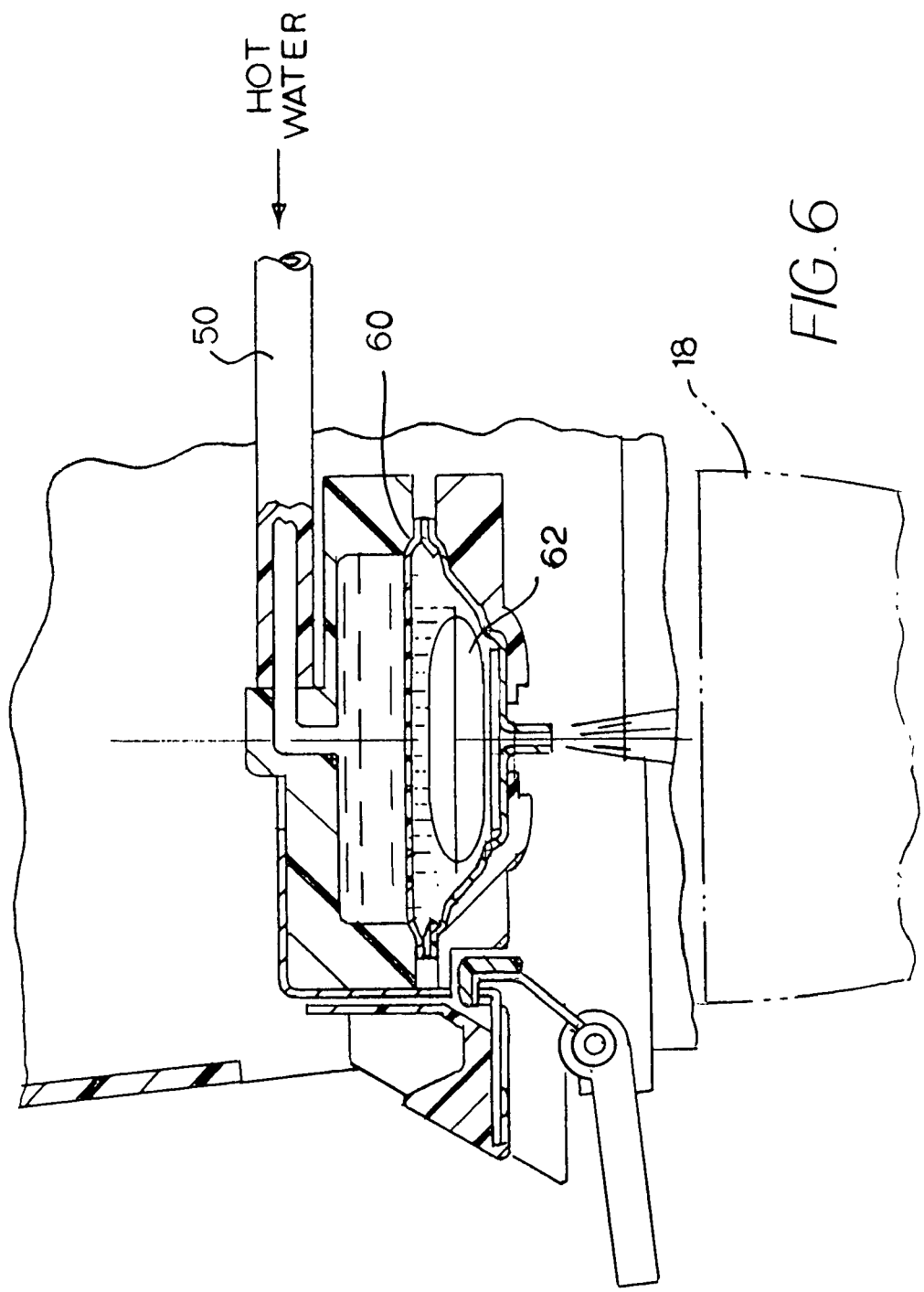
FIG. 6 is a sectional view of the exemplary brewer apparatus of FIG. 1 taken along line 6—6 of FIG. 1 and illustrating the positioning of the pod below the brew head.

With respect to the opening and closing of the solenoid valve 48, it should be noted that the control logic 100 is also in electrical communication with the solenoid valve 48, such that the solenoid valve 48 can also be closed simultaneously with the de-activation of the pump 34 to terminate the water flow through the brewer apparatus 10 and ensure a precise, predetermined volume of hot water is delivered to the brew head 60 (as illustrated in FIG. 6).

As described above, the brewer apparatus 10 of the present invention is designed to use a pod 62 in the brewing process. This pod 62 is received and held in a tray or similar receptacle 16 and positioned below the brew head 60 of the apparatus 10, such that hot water is directed from the brew head 60 over and through the pod 62 and enclosed beverage component, with the brewed beverage then being dispensed into a cup or similar container 18, as illustrated in FIGS. 1 and 6. Again, the focus of the present invention is on allowing a consumer to select a desired strength of beverage, and as illustrated in the enlarged view of FIG. 2, the exemplary brewer apparatus 10 thus includes a selector switch 20 having three strength settings for coffee: (1) a light setting; (2) a regular setting; and (3) a strong setting, and a fourth setting for tea. A consumer selects the appropriate setting by rotating the selector switch 20 to the desired position, and then presses the "brew" button 22 to initiate the brewing process.

Referring again to FIG. 3, if the selector switch 20 is rotated to indicate that a light coffee is desired, upon pressing the "brew" button 22, the pump 34 is activated and continues to pump water until a precise, predetermined volume of water has been delivered to the hot water tank 44 (as measured by the flow meter 40), which, in turn, causes a precise, predetermined volume of hot water to be delivered to the brew head 60. Specifically, once the precise, predetermined volume of water has been measured, the control logic 100 de-activates the pump 34 and closes the solenoid valve 48. The predetermined volume of hot water is distributed to and passes over and through the coffee pod 62, and the brewed beverage is dispensed through an outlet and into a cup or similar container 18, as illustrated in FIGS. 1 and 6.

If the selector switch 20 is rotated to indicate that a regular coffee is desired, upon pressing the "brew" button 22, the control logic 100 activates the pump 34 for a brief time period until a predetermined volume of hot water (for example, 0.50–1.0 fl-oz.) is delivered to moisten the coffee pod 62. The control logic 100 then deactivates the pump 34 for a predetermined time period (for example, 3–5 seconds) to allow for pre-infusion of the coffee grounds to improve extraction and make a stronger coffee. The control logic 100 then re-activates the pump 34, which then continues to pump water until a precise, predetermined volume of water has been delivered to the hot water tank 44 (as measured by the flow meter 40), which, in turn, causes a precise, predetermined volume of hot water to be delivered to the brew head 60. Specifically, once the precise, predetermined volume of water has been measured, the control logic 100 de-activates the pump 34 and closes the solenoid valve 48. Again, this predetermined volume of hot water is distributed to and passes over and through the coffee pod 62, and the brewed beverage is dispensed through an outlet and into a cup or similar container 18, as illustrated in FIGS. 1 and 6.

If the selector switch 20 is rotated to indicate that a strong coffee is desired, upon pressing the "brew" button 22, the control logic 100 activates the pump 34 for a brief period until a predetermined volume of hot water (for example, 0.50–1.0 fl-oz.) is delivered to the coffee pod 62, and then de-activates the pump 34 for a predetermined time period (for example, 3–5 seconds), with such an on-off or "pulsing cycle" of water delivery followed by a timed delay continuing until a precise, predetermined volume of water has been delivered to the hot water tank 44 (as measured by the flow meter 40), which, in turn, causes a precise, predetermined volume of hot water to be delivered to the brew head 60. Specifically, once the precise, predetermined volume of water has been measured, the control logic 100 de-activates the pump 34 and closes the solenoid valve 48.

Figure 7:
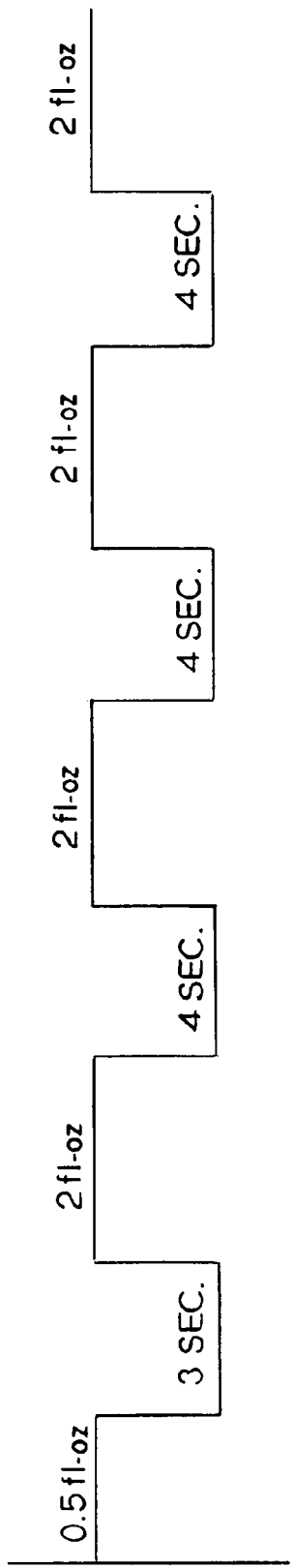
FIG. 7 illustrates one exemplary pulsing cycle for the apparatus and method of the present invention.

For example, referring now to FIG. 7, in one exemplary pulsing cycle, 0.5 fl-oz. of hot water is initially delivered to the coffee pod 62. The control logic 100 then terminates delivery of the hot water for three seconds. Subsequently, four individual "pulses" of 2.0 fl-oz. of hot water are delivered to the coffee pod 62, with an intermittent time delay between each such pulse of four seconds, resulting in delivery of a total of 8.5 fl-oz. of hot water to the coffee pod 62.

Figure 8:
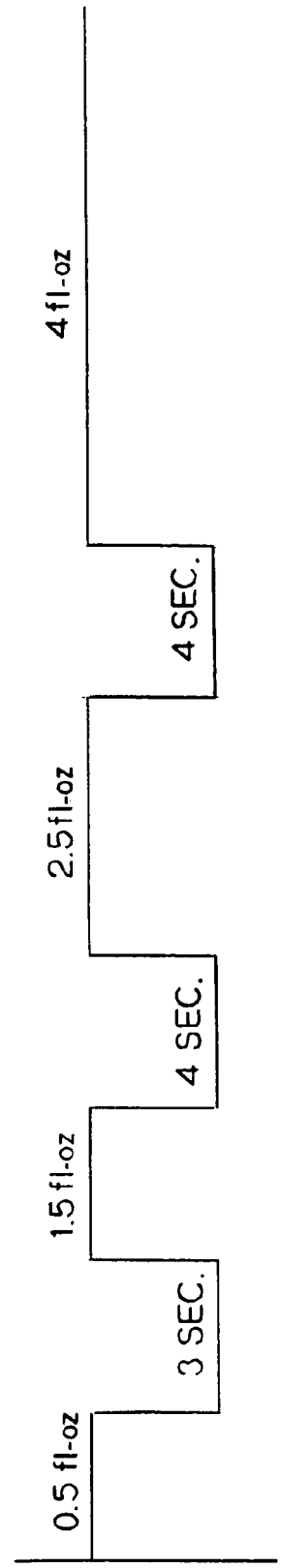
FIG. 8 illustrates another exemplary pulsing cycle for the apparatus and method of the present invention.

Furthermore, the pulsing cycle may also take the form of a non-periodic waveform in that there is no repeating "pulse," i.e., volume of hot water delivered to the coffee pod 62. As illustrated in the exemplary pulsing cycle of FIG. 8, 0.5 fl-oz. of hot water is initially delivered to the coffee pod 62. The control logic 100 then terminates delivery of the hot water for three seconds. Subsequently, 1.5 fl-oz. of hot water is delivered to the coffee pod 62. After a four-second delay, 2.5 fl-oz. of hot water is delivered to the coffee pod 62. After another four-second delay, 4.0 fl-oz. of hot water is delivered to the coffee pod 62.

In short, a wide variety of pulsing cycles my be used to accomplish the desired result—providing a stronger brewed beverage by allowing for further infusion of the beverage component during the periodic timed delays.

Finally, if the selector switch 20 is provided with an option to brew tea (as in this exemplary embodiment) and is rotated to this option, similar to the strong coffee option, the pump 34 is activated and pulses to pump water until a precise, predetermined volume of water has been delivered to the hot water tank 44, at which time the control logic 100 de-activates the pump 34 and closes the solenoid valve 48.

In any event, regardless of which option is chosen, a constant predetermined volume of brewed beverage is dispensed. In other words, the strength of the brewed beverage is not altered by merely adding or subtracting water, but rather by increasing or decreasing the total dissolved solids in the brewed beverage.

It will be obvious to those skilled in the art that other modifications may also be made to the exemplary embodiment described herein without departing from the spirit and scope of the present invention.

The invention claimed is:

1. An apparatus for preparing and dispensing a brewed beverage, comprising:
   a plumbing system for delivering water to a brew head;
   a receptacle for receiving and positioning a quantity of a beverage component below the brew head; and
   a selector switch and associated control logic for controlling operation of said plumbing system, wherein the selector switch allows for the selection of one of the following discrete options—
      a first option in which the plumbing system and control logic causes a first predetermined volume of water to be delivered to the brew head without significant interruption and distributed over the beverage component, creating the brewed beverage with a first desired strength, which is then dispensed into a container positioned below said receptacle, or
      a second option in which the plumbing system and control logic causes a second predetermined volume of water to be delivered to the beverage component, then terminates water flow for a first predetermined time period, and then resumes and continues to deliver water without significant interruption until the first predetermined volume of water has been delivered to the brew head and distributed over the beverage component, creating the brewed beverage with a second desired strength that is greater than the first desired strength, which is then dispensed into the container positioned below said receptacle.

2. The apparatus as recited in claim 1, wherein the selector switch allows for the selection of a third option in which the plumbing system and control logic causes a third predetermined volume of water to be delivered to the beverage component and then terminates water flow for a second predetermined time period, with such a pulsing cycle of water delivery followed by a timed delay continuing until the first predetermined volume of water has been delivered to the brew head and distributed over the beverage component, creating the brewed beverage with a third desired strength that is greater than the second desired strength, which is then dispensed into the container positioned below said receptacle.

3. The apparatus as recited in claim 1, in which the plumbing system includes a flow meter to measure volumetric water flow, said flow meter being in communication with the control logic so that water flow can be controlled according to the selected option.

4. The apparatus as recited in claim 1, in which the plumbing system includes a pump for drawing water from a reservoir and directing water into and through a hot water tank to the brew head.

5. The apparatus as recited in claim 4, in which the plumbing system further includes a flow meter that is interposed between the pump and said hot water tank to measure volumetric water flow, said flow meter being in communication with the control logic so that the pump can be selectively deactivated to control water flow according to the selected option.

6. The apparatus as recited in claim 5, and further comprising a solenoid valve that is interposed between the hot water tank and the brew head, said solenoid valve being in communication with the control logic such that the solenoid valve can also be closed simultaneously with the de-activation of the pump to control water flow according to the selected option.

7. The apparatus as recited in claim 2, in which the plumbing system includes a flow meter to measure volumetric water flow, said flow meter being in communication with the control logic so that water flow can be controlled according to the selected option.

8. The apparatus as recited in claim 2, in which the plumbing system includes a pump for drawing water from a reservoir and directing water into and through a hot water tank to the brew head.

9. The apparatus as recited in claim 8, in which the plumbing system further includes a flow meter that is interposed between the pump and said hot water tank to measure volumetric water flow, said flow meter being in communication with the control logic so that the pump can be selectively deactivated to control water flow according to the selected option.

10. The apparatus as recited in claim 9, and further comprising a solenoid valve that is interposed between the hot water tank and the brew head, said solenoid valve being in communication with the control logic such that the solenoid valve can also be closed simultaneously with the de-activation of the pump to control water flow according to the selected option.

11. An apparatus for preparing and dispensing a brewed beverage, comprising:
    a plumbing system for delivering water to a brew head;
    a receptacle for receiving and positioning a quantity of a beverage component below the brew head; and
    a selector switch and associated control logic for controlling operation of said plumbing system, wherein the selector switch allows for the selection of one of the following discrete options—
       a first option in which the plumbing system and control logic causes a first predetermined volume of water to be delivered to the brew head without significant interruption and distributed over the beverage component, creating the brewed beverage with a first desired strength, which is then dispensed into a container positioned below said receptacle, or
       a second option in which the plumbing system causes a second predetermined volume of water to be delivered to the beverage component and then terminates water flow for a first predetermined time period, with such a pulsing cycle of water delivery followed by a timed delay continuing until the first predetermined volume of water has been delivered to the brew head and distributed over the beverage component, creating the brewed beverage with a second desired strength that is greater than the first desired strength, which is then dispensed into the container positioned below said receptacle.

12. The apparatus as recited in claim 11, wherein said selector switch allows for the selection of a third option in which the plumbing system and control logic causes a third predetermined volume of water to be delivered to the beverage component, then terminates water flow for a second predetermined time period, and then resumes and continues to deliver water without significant interruption until the first predetermined volume of water has been delivered to the brew head and distributed over the beverage component, creating the brewed beverage with a third desired strength that is greater than the first desired strength but less than the second desired strength, which is then dispensed into the container positioned below said receptacle.

13. The apparatus as recited in claim 11, in which the plumbing system includes a flow meter to measure volumetric water flow, said flow meter being in communication with the control logic so that water flow can be controlled according to the selected option.

14. The apparatus as recited in claim 11, in which the plumbing system includes a pump for drawing water from a reservoir and directing water into and through a hot water tank to the brew head.

15. The apparatus as recited in claim 14, in which the plumbing system further includes a flow meter that is interposed between the pump and said hot water tank to measure volumetric water flow, said flow meter being in communication with the control logic so that the pump can be selectively deactivated to control water flow according to the selected option.

16. The apparatus as recited in claim 15, and further comprising a solenoid valve that is interposed between the hot water tank and the brew head, said solenoid valve being in communication with the control logic such that the solenoid valve can also be closed simultaneously with the de-activation of the pump to control water flow according to the selected option.

17. An apparatus for preparing a brewed beverage, comprising:
  a receptacle for receiving and positioning a quantity of a beverage component;
  a plumbing system for delivering water to the beverage component; and
  a selector switch and associated control logic for controlling operation of said plumbing system, wherein the selector switch allows for the selection of at least two of the three following discrete options—
    a first option in which the plumbing system and control logic causes a first predetermined volume of water to be delivered to and distributed over the beverage component without significant interruption, creating the brewed beverage with a first desired strength,
    a second option in which the plumbing system and control logic causes a second predetermined volume of water to be delivered to the beverage component, then terminates water flow for a first predetermined time period, and then resumes and continues to deliver water without significant interruption until the first predetermined volume of water has been delivered to and distributed over the beverage component, creating the brewed beverage with a second desired strength that is greater than the first desired strength, or
    a third option in which the plumbing system and control logic causes a third predetermined volume of water to be delivered to the beverage component and then terminates water flow for a second predetermined time period, with such a pulsing cycle of water delivery followed by a timed delay continuing until the first predetermined volume of water has been delivered to and distributed over the beverage component, creating the brewed beverage with a third desired strength that is greater than the second desired strength.

18. The apparatus as recited in claim 17, and further comprising a brew head for distributing the water over the beverage component.

19. The apparatus as recited in claim 17, in which said plumbing system includes a flow meter to measure volumetric water flow, said flow meter being in communication with the control logic so that water flow can be controlled according to the selected option.

20. The apparatus as recited in claim 18, in which said plumbing system includes a pump for drawing water from a reservoir and directing water into and through a hot water tank to the brew head.

21. The apparatus as recited in claim 20, in which said plumbing system further includes a flow meter that is interposed between the pump and said hot water tank to measure volumetric water flow, said flow meter being in communication with the control logic so that the pump can be selectively deactivated to control water flow according to the selected option.

22. The apparatus as recited in claim 21, and further comprising solenoid valve that is interposed between the hot water tank and the brew head, said solenoid valve being in communication with the control logic such that the solenoid valve can also be closed simultaneously with the de-activation of the pump to control water flow according to the selected option.

23. An apparatus for brewing coffee, comprising:
  a plumbing system, including a pump and a hot water tank, for heating water and delivering hot water to a brew head;
  a receptacle for receiving and positioning a quantity of coffee grounds below said brew head; and
  a selector switch and associated control circuit for controlling operation of the pump, wherein the selector switch allows for the discrete selection of at least two of the following discrete options—
    a first option in which the pump is activated and continues to pump water without significant interruption until a first predetermined volume of water has been delivered to the brew head and distributed over the coffee grounds, with the brewed coffee having a first desired strength being dispensed into a container positioned below said receptacle,
    a second option in which the pump is activated until a second predetermined volume of water is delivered to the coffee grounds, then de-activated for a first predetermined time period, and then re-activated and continues to pump water without significant interruption until the first predetermined volume of water has been delivered to the brew head and distributed over the coffee grounds, with the brewed coffee having a second desired strength that is greater than the first desired strength being dispensed into the container positioned below said receptacle, or
    a third option in which the pump is activated until a third predetermined volume of water is delivered to the coffee grounds and then de-activated for a second predetermined time period, with such a pulsing cycle of water delivery followed by a timed delay continuing until the first predetermined volume of water has been delivered to the brew head and distributed over the coffee grounds, with the brewed coffee having a third desired strength that is greater than the second desired strength being dispensed into the container positioned below said receptacle.

24. The apparatus as recited in claim 23, in which the plumbing system further includes a flow meter that is interposed between the pump and said hot water tank to measure volumetric water flow, said flow meter being in communication with the control logic so that the pump can be selectively deactivated to control water flow according to the selected option.

25. The apparatus as recited in claim 24, and further comprising a solenoid valve that is interposed between the hot water tank and the brew head, said solenoid valve being in communication with the control logic such that the solenoid valve can also be closed simultaneously with the de-activation of the pump to control water flow according to the selected option.

* * * * *